No. 803,264.　　　　　　　　　　　　　　PATENTED OCT. 31, 1905.
W. BALKE.
BRAKE FOR CARS.
APPLICATION FILED JUNE 27, 1905.
2 SHEETS—SHEET 1.
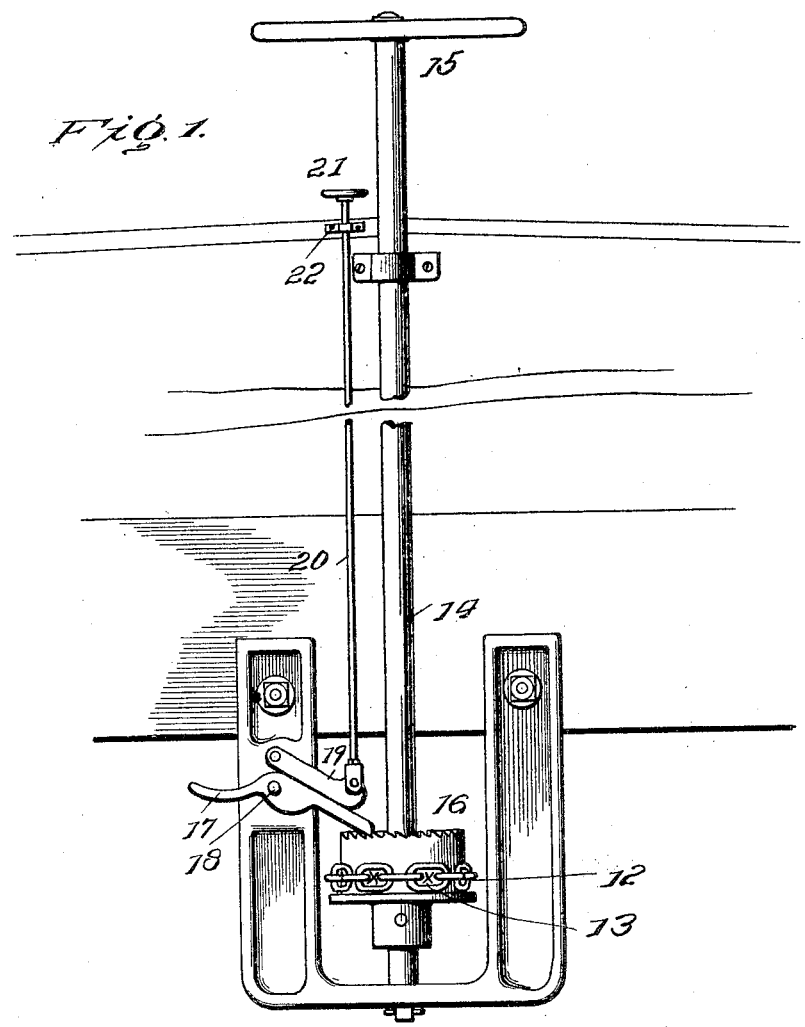
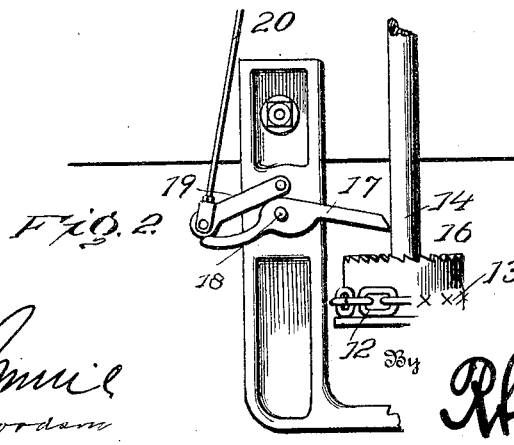
Witnesses　　　　　　　　　　　　　　　Inventor
　　　　　　　　　　　　　　　William Balke,
　　　　　　　　　　　　　　By
　　　　　　　　　　　　　　　R. A. B. Lacey, Attorneys

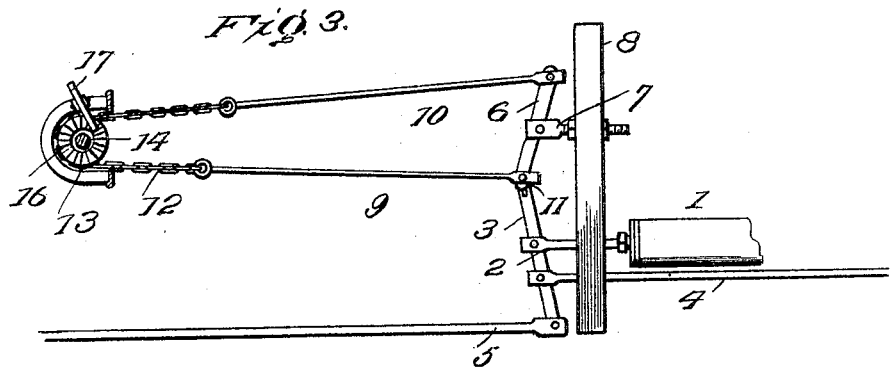
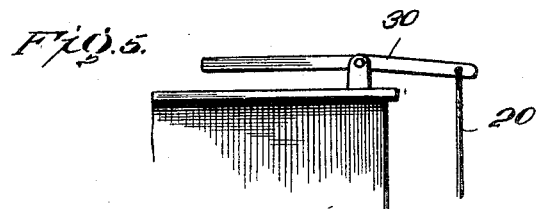
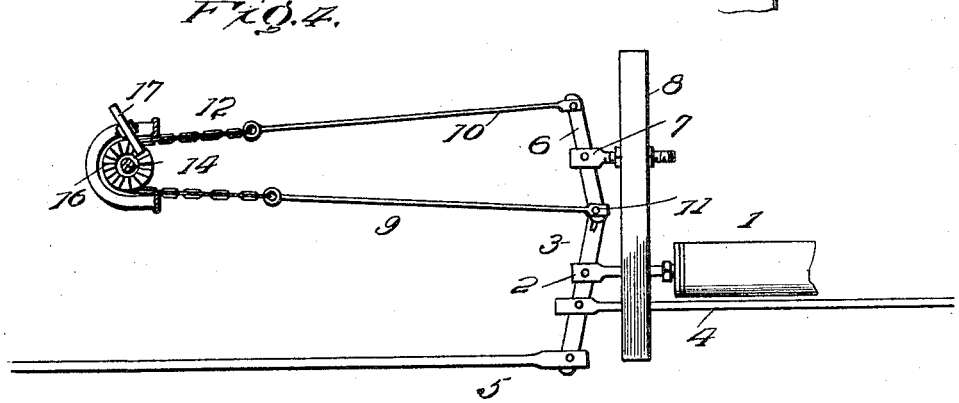

UNITED STATES PATENT OFFICE.

WILLIAM BALKE, OF CLINTON, MISSOURI.

BRAKE FOR CARS.

No. 803,264.　　　Specification of Letters Patent.　　　Patented Oct. 31, 1905.

Application filed June 27, 1905. Serial No. 267,299.

*To all whom it may concern:*

Be it known that I, WILLIAM BALKE, a citizen of the United States, residing at Clinton, in the county of Henry and State of Missouri, have invented certain new and useful Improvements in Brakes for Cars, of which the following is a specification.

This invention relates particularly to improvements in brake mechanism for railway-cars, and includes novel means securing a peculiar coöperation, broadly, between the operating mechanism of the air-brake and manually-operated means for said brake.

The essential feature of the invention is comprised in the structure of the mechanism whereby the air may be applied in the customary way to set the air-brake, and means specially devised for the purpose employed for locking or holding the air-brake set, said means coacting with the manually-operated mechanism adapted to set the brakes under certain conditions of service. In other words, the air-brake may be set in the usual way and the same may be held set by merely throwing a suitable lock device into coöperation with the manually-operated mechanism, so as to lock the latter from movement, thereby preventing release of the brake even though the pressure of the air is relieved by disconnecting the train-pipe sections or otherwise.

Under all working conditions the manually-operated brake mechanism contemplated in the invention is actuated when the air-brake is operated either in setting or releasing the same, and in this construction will be noted an important feature of the invention, as will be pointed out more clearly as the description proceeds.

For a full description of the invention and the merits thereof and also to acquire a knowledge of the details of construction of the means for effecting the result reference is to be had to the following description and accompanying drawings, in which—

Figure 1 is an end elevation of a freight-car, showing operating mechanism for the brakes, parts broken away. Fig. 2 is a broken view showing the weight-dog holding the pawl out of engagement with the ratchet-wheel of the brake-shaft. Fig. 3 is plan view showing the arrangement of the brake-levers and connections, the brake parts shown as when the brakes are set. Fig. 4 is a view similar to Fig. 3, the brake parts being arranged as when the brakes are released. Fig. 5 is a broken view showing a foot-lever connected for operation of the operating-rod.

Corresponding and like parts are referred to in the following description and indicated in all the views of the drawings by the same reference characters.

Referring to the drawings describing those parts of the construction shown included in the invention, the numeral 1 designates a brake-cylinder which will be supplied with compressed air in the customary way, the piston-rod 2 of the piston in said cylinder being connected to a main brake-lever 3, fulcrumed between its ends to a brake-rod 4, which runs to the rear truck of the car by which the cylinder 1 is carried. The outer end of the brake-lever 3 has a second brake-rod 5 pivotally connected thereto, the latter extending in a direction opposite the rod 4 and running to the front truck of the car, as will be obvious. The end of the lever 3 opposite that connected with the rod 5 is pivoted to an adjacent end of an auxiliary lever 6, mounted in a fulcrum 7, which is carried by a transverse needle-beam 8.

It will be noted that the air-operated means for setting the brake is directly connected with the lever 3. The hand or manually-operated mechanism, however, is connected more directly with the auxiliary lever 6, and for this purpose spaced rods 9 and 10 are connected with opposite ends of the lever 6, one end of the rod 10 being pivoted to the outer end of the lever 6, while the corresponding end of the rod 9 is pivotally connected with the levers 6 and 3 by the pivotal connection 11, which connects these two levers. The brake-rods 9 and 10 are flexibly connected at one end by a chain 12, and this chain passes about a sprocket-wheel 13, mounted on the brake-shaft 14, said brake-shaft 14 being of the common type employed upon freight and similar cars at present in use. A brake-wheel 15 is carried by the upper end of the brake-shaft 14, and near the lower end of said brake-shaft 14 is secured the ratchet-wheel 16, adapted to be engaged by a pawl 17. The pawl 17 is pivoted between its ends, as shown at 18, and said pawl is adapted to be held either in or out of engagement with the ratchet-wheel 16 by a weight-dog 19, the latter being pivoted above the pawl and weighted at one end. When the weighted end portion of the dog 19 is disposed upon the outer end of the pawl 17, said pawl will be held disengaged from the ratchet-wheel 16, whereas when the weighted end of the dog 19 is supported by the engaging end of the pawl the said pawl is caused to remain in engagement with said ratchet-wheel. When the brake mechanism is employed upon the usual construction of freight-cars, it is preferred to utilize an operating-rod 20 for actuating the dog 19, said rod 20 being connected at its lower end with the weighted end of the dog 19, the upper end of the rod projecting a short distance above the top of the car and having a suitable handle 21 affixed thereto. The rod 21 will be held in place by a bracket 22 applied to the front of the car, and it will be understood that on low cars the rod 20 is also used.

The construction of the brake mechanism having been set forth before, the operation and advantages thereof will be pointed out. The manually and air operated means for actuating the brakes may be used in the customary way when the cars are in motion, as it will be apparent that whenever it is desired to apply the brakes the air admitted to the cylinder 1 will actuate the brake-lever 3, which is directly connected with the brake-beams of the front and rear trucks by the rods 4. Of course when the brakes are set by air and operated as above described the movement of the brake-lever 3 under the actuation of the piston-rod 2 will impart movement to the brake-lever 6 and will cause revolution of the brake-shaft 14 through the connection established by the members 9, 10, and part 12. In like manner should it be desired to apply the brakes by hand the brake-shaft 14 can be readily operated in the usual way by grasping the wheel 15 and turning the same. The particular advantage arising from the coöperation of the manually and air operated mechanisms, however, is apparent where it is desired to apply the brakes with great force and keep the same set after the train has been stopped, for instance. The above may be done automatically, as the dog 19 may be thrown into a position upon the pawl 17 to cause said pawl to remain in engagement with the ratchet-wheel 16. When engaged with the ratchet-wheel 16, the pawl 17 will hold the brakes set after the same have been operated by the air-operated means, because of the fact that as soon as the brake-rods 4 and 5 are actuated on admission of air to the cylinder 1 in the customary way the brake-lever 6 will also be actuated and will cause rotation of the brake-shaft 14. The pawl 17 being in engagement with the ratchet-wheel 16 will freely ride thereover, over the teeth thereof as the brakes are being set; but said pawl will keep the brake-shaft 14 from turning to release the brakes even though the air-pressure in the cylinder 1 be relieved by disconnecting cars or otherwise. Cars may be left on sidings for loading and other purposes and the brakes set by air previous to leaving said cars, and there is little likelihood of tampering with the brakes by boys, so as to release the same and give rise to likelihood of movement of the cars from the siding, and accident. To release the brakes after the same have been set will require the strength of a man, because of the great power applied when said brakes are operated by the air-operated means. When the cars are taken up by a train, the preferred manner of releasing the brakes is to have the engineer admit air to the cylinders of the cars, so as to hold the brakes set, the weight-dogs 19 having previously been thrown upon the outer ends of the pawls 17. As soon as the air-pressure is admitted to the cylinders the members 19 will throw the pawls 17 out of engagement with the ratchet-wheels 16, and the engineer may then release the air and the brakes will be free.

It will be seen that the locking or holding means for holding the brakes set will operate automatically when the members 19 have been thrown upon the engaging ends of the pawls 17, and in releasing the brakes it is not necessary for the trainmen to go on top of the cars to accomplish the same by hand, as the members 19 may be thrown off of the engaging ends of the pawls 17 by a trainman at a side of the cars, this accomplishing a great saving of time and labor, and various other advantages arise from the construction before mentioned.

The sprocket or ratchet wheel carried by the brake-shaft may be reversed, if desired, so that the teeth of the ratchet-wheel will be up or down. When the teeth are down, likelihood of interference with the operation thereof by the elements is obviated. The operating-rod 20 may be worked by hand or foot by the provision of a foot-lever 30 or the like, as shown in Fig. 5. The brake is of course adapted for use on the tenders of locomotives as well as on cars.

Having thus described the invention, what is claimed as new is—

1. The combination of a car, an air-brake applied thereto, manually-operated means for setting the brake mechanism and operable by the air-brake, and lock means coacting with the manually-operated means to hold the air-brake set.

2. The combination of a car, an air-brake applied thereto, manually-operated means for setting the air-brake, and automatically-operating means coacting with the manually-operated means aforesaid for holding the brakes set after the same have been applied by the air-operated mechanism therefor.

3. The combination of a car, an air-brake applied thereto, manually-operated means for setting the air-brake, and automatically-operating means coacting with the manually-operated means aforesaid for holding the brakes set after the same have been applied by the air-operated mechanism therefor and operable by the air-brake mechanism.

4. The combination of a car, an air-brake applied thereto, manually-operated means for setting the air-brake and operable by the air-brake, lock means coacting with the manually-operated means to hold the air-brake set, and means admitting of operation of the air-brake independently of the lock means.

5. The combination of a car, an air-brake applied thereto, manually-operated means for setting the air-brakes, automatically-operating lock means coacting with the manually-operated means aforesaid for holding the brake set after the same has been applied by the air-operating brake means therefor, and means admitting of operation of the air-brake independently of the automatically-operating lock means.

6. The combination of a car, an air-brake applied thereto and embodying a pressure-cylinder, a brake-lever, a piston-rod connected with the brake-lever aforesaid, brake-rods connecting said brake-lever with the brake-beams, and manually-operated means connected with said brake-lever and operable thereby.

7. The combination of a car, an air-brake applied thereto and embodying a pressure-cylinder, a brake-lever, a piston-rod connected with the brake-lever aforesaid, brake-rods connecting said brake-lever with the brake-beams, manually-operated means embodying an auxiliary brake-lever connected with the first-mentioned brake-lever, and brake-rods connected with said auxiliary brake-lever.

8. The combination of a car, an air-brake applied thereto and embodying a pressure-cylinder, a brake-lever, a piston-rod connected with the brake-lever aforesaid, brake-rods connecting said brake-lever with the brake-beams, manually-operated means connected with said brake-lever and operable thereby, and lock means coöperating with the manually-operated means for holding the brake set after the same has been applied by the air-operated mechanism.

9. The combination of a car, an air-brake applied thereto and embodying a pressure-cylinder, a piston-rod, a brake-lever connected with said piston-rod, brake-rods connecting the brake-lever aforesaid with the brake-beams, a supporting-beam, an auxiliary brake-lever fulcrumed to the supporting-beam and pivotally connected at one end with the first-mentioned brake-lever, a connection passing about the brake-shaft for rotation thereof and connected with opposite ends of the auxiliary brake-lever, and means for locking the brake-shaft from movement including a locking-pawl and means for holding said pawl in or out of coöperation with the brake-shaft.

In testimony whereof I affix my signature in presence of two witnesses.

WILLIAM BALKE. [L. S.]

Witnesses:
JOHN J. GERAGHTY,
S. E. NEALE.